March 2, 1943.  M. M. B. ABRIBAT  2,313,007
METHOD FOR TREATING MATERIALS
Filed May 23, 1940  3 Sheets-Sheet 1
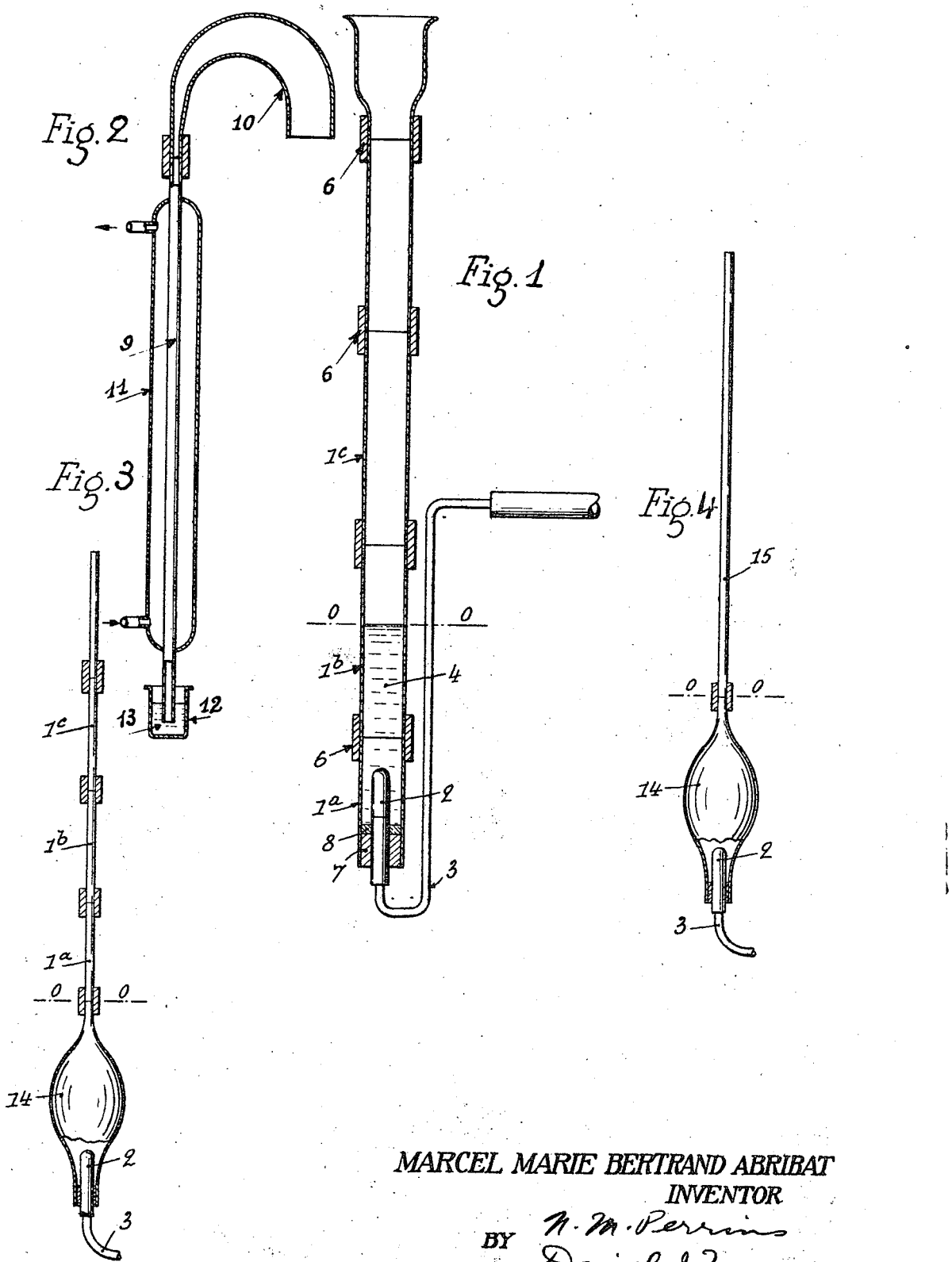
MARCEL MARIE BERTRAND ABRIBAT
INVENTOR
BY
ATTORNEYS March 2, 1943. M. M. B. ABRIBAT 2,313,007
METHOD FOR TREATING MATERIALS
Filed May 23, 1940 3 Sheets-Sheet 2
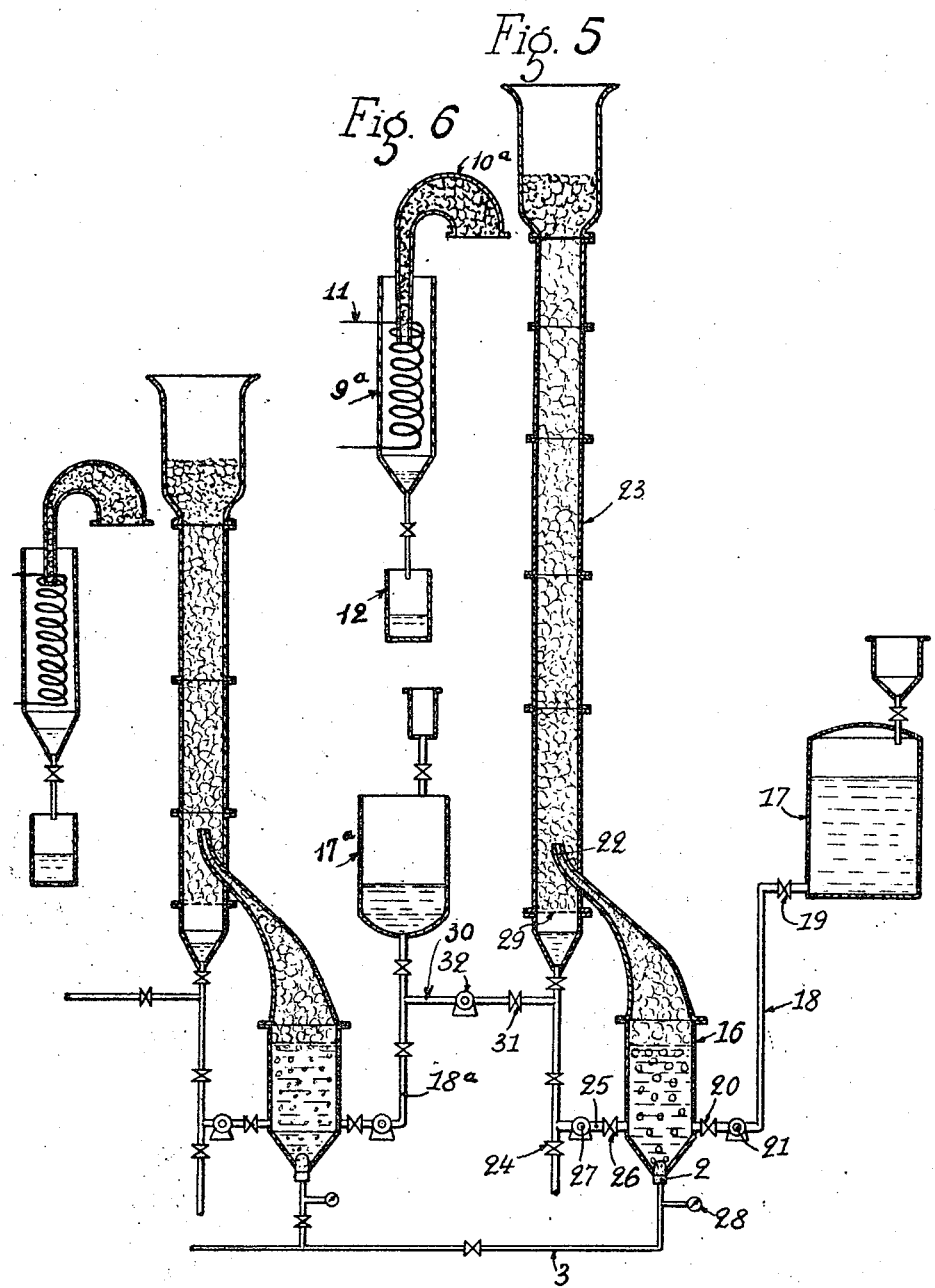
MARCEL MARIE BERTRAND ABRIBAT
INVENTOR
BY
ATTORNEYS

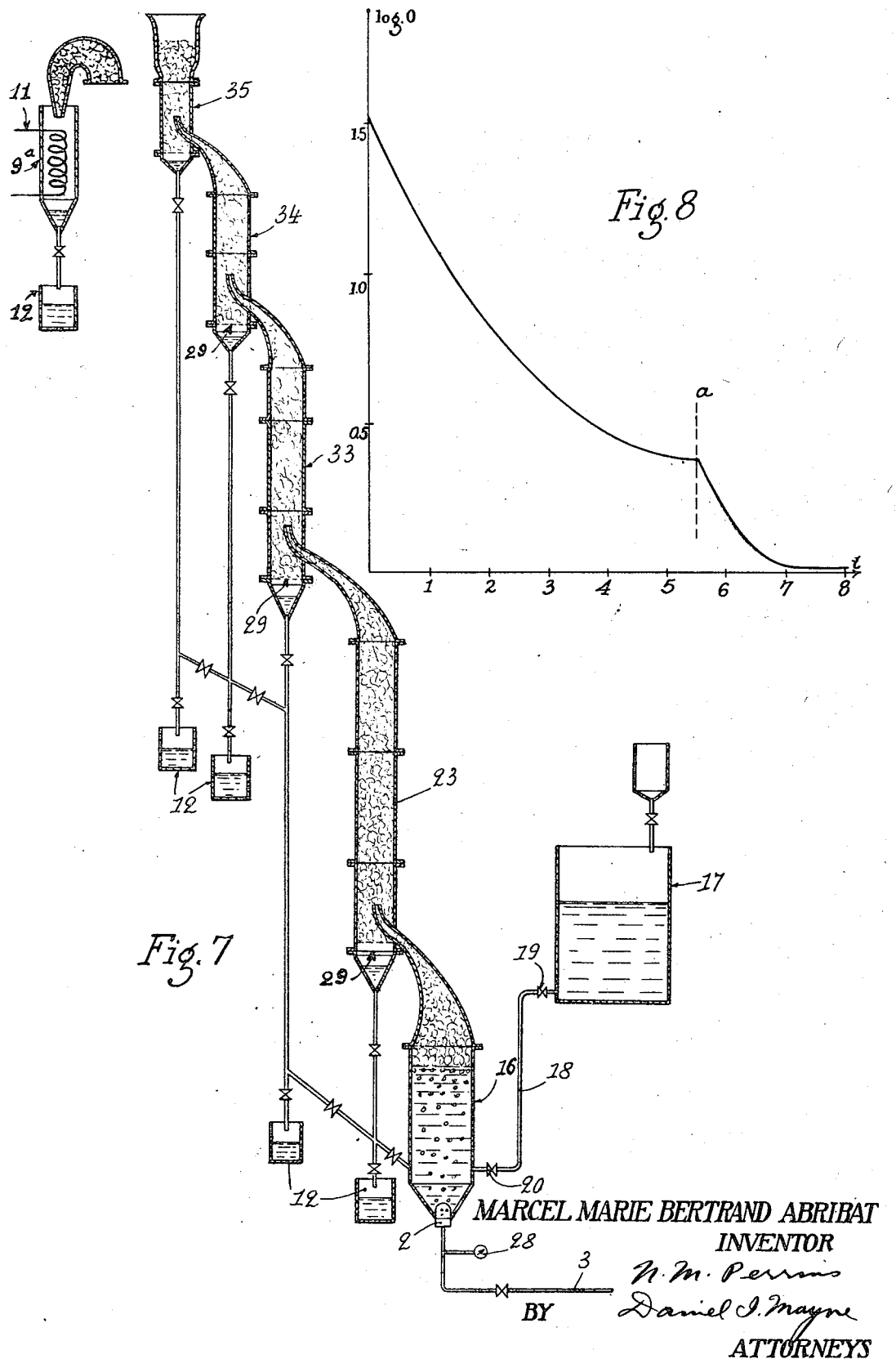

Patented Mar. 2, 1943

2,313,007

UNITED STATES PATENT OFFICE 2,313,007

METHOD FOR TREATING MATERIALS

Marcel Marie Bertrand Abribat, Vincennes, France; vested in the Alien Property Custodian Application May 23, 1940, Serial No. 336,786
In France May 25, 1939

2 Claims. (Cl. 252—303)

This invention relates to the separation of dissolved and or colloidal substances from solutions thereof by means of foam formation.

It is known that when a solution of a substance, such as a solution containing sodium cholate and saponin is caused to foam at ordinary temperature, the foam becomes distinctly enriched by sodium cholate, while at 50° C. there is found in the foam less of the sodium cholate than of the saponin. Such methods were directed to the separation of two substances by directing one of them into the foam while leaving the other in the liquid. There has also been proposed a method of producing a separation of two colloids in a solution thereof (such as potassium stearate and sodium oleate) by causing such solution to foam and continually returning the top portions of such foam to the lower portions until two so-called fractions are obtained namely: the residual liquid itself, and the foam, as opposed to the old method which gave three so-called fractions namely: the residual liquid, the scum and the foam.

One object of my invention is a method of separating several substances from a dispersion thereof. Such dispersion may be a solution or a colloidal dispersion.

Another object of my invention is the separation of a mixture of materials from true or colloidal solutions which is adapted for use with unusually small amounts and concentrations of such materials. Further objects of my invention will appear hereinafter.

My invention is based on the discovery that by subjecting a liquid containing a plurality of dissolved and/or dispersed substances to a foaming treatment for a sufficient period of time, under conditions such that the foam drains in a direction counter-current to the direction of movement of the bubbles produced by the foam forming treatment, the said substances become segregated in the foam itself at different distances from the surface of the liquid. In one preferred form of my invention I continue the foam forming treatment until the liquid has become devoid of dissolved and dispersed substances, and only then remove one or more of the fractions of the foam, each fraction of which contains a different substance. In the simplest methods of carrying out the invention, the draining of the foam occurs by gravity and the bubbles rise from an orifice or orifices in the lower part of the liquid.

This phenomenon which I have discovered and which forms the basis of my invention is analogous to the phenomenon of dephlegmation of mixtures of differently volatile substances which are separated by distillation, and I herein term the new phenomenon I have discovered "dephlegmation of foams."

In carrying out my invention and allowing the foam to drain by gravity it is essential that the foam be formed in a relatively long vertical column in order to allow of adequate draining of the foam during the whole time of the foam forming treatment and also it is essential that none of the foam be removed until the foam forming treatment has been continued a sufficient time to allow the dissolved or dispersed substances to become segregated at different heights in the foam column. The foam column may be either a simple column or a series of columns as will be hereinafter described in greater detail. The segregation must be such that one obtains in the foam column at least two substances (either or both of which may have been dissolved or dispersed in the liquid) concentrated at different heights of the foam column. I have found that such segregation is due to the fact that different substances produce in the bubbles of their foams, surface layers of different rigidities and it is the magnitudes of such rigidities which determine the segregation of the substances at different heights of the foam column and not the surface tensions, although such surface tensions may play a part. However, I do not limit myself to any particular theory as to the nature of the phenomenon but only to the claims appended to the end of this description.

When carrying out my invention by the aid of a simple column of foam, I prefer, as hereinafter explained in greater detail, to continue the foam forming operation until the total amount of foam formed above the liquid has reached a constant amount. This occurs when a state of equilibrium has been reached and the new bubbles formed by the foam forming treatment no longer have sufficient rigidity to cause the total amount of foam to increase.

During the foam forming treatment the foam drains, and while draining may be effected only and completely by gravity, it is also possible to drain the fractions of foam mechanically, for instance by centrifuging said fractions removed from the foaming tube according as or after they have been formed.

An object of the invention is also to provide apparatus and installations for the dephlegmation of foams according to my invention.

Various types of apparatus for dephlegmating foams will now be described. It is to be understood that the types described and illustrated are only given by way of example and they can vary in their shapes and their dimensions within certain limits according to the nature of the liquids to be treated and the substances to be separated. These apparatus can have very considerable dimensions when large quantities of liquid are to be treated which contain very small quantities of substances to be separated or on the other hand when the foam formed is very voluminous or when it drains very slowly.

In the attached drawings, given only by way of example:

Fig. 1 is a diagram of a foam dephlegmation apparatus according to the invention;

Fig. 2 shows a defoaming tube which may be used with the apparatus shown in Fig. 1;

Figs. 3 and 4 are other diagrams of foam dephlegmation apparatus according to the invention;

Fig. 5 is a diagram of an installation of several apparatus in series;

Fig. 6 shows a defoaming tube which may be used with one of the apparatus shown in Fig. 1.

Fig. 7 is a diagram of an installation of several apparatus in cascade;

Fig. 8 is a graph of the logarithm of the opacity as a function of time for a sol of collargol treated according to the invention.

A simple type of foam dephlegmator is shown in Fig. 1. It is composed of a vertical tube which is formed by a certain number of sections $1^a, 1^b, 1^c \ldots$ which are connected together by the external rubber sleeves 6. The lower extremity of this tube is closed by means of a plug 7, for example of rubber, in which is inserted a porous porcelain filter candle 2 (for example a Chamberland filter of porosity $L^1$), the unglazed part of which is wholly contained within the interior of the tube. An isolating layer 8, for example of paraffin, deposited in the interior of the tube, over the plug 7, isolates the latter from the liquid 4 which is to be treated. A tube 3 firmly fixed to the filter candle 2, conducts the gas into the interior of the latter and the pressure is sufficient to force the gas to escape through the pores of the unglazed porcelain (pressures of the order of 0.5 to 2 kg. per cm.$^2$, air provided by a compressor, or nitrogen or other gas supplied from an orifice furnished with a pressure regulator and a manometer).

In order to introduce the solution to be treated into the tube ($1^a, 1^b \ldots$), one can either use a filling tube fitted with a tap or dismount one of the upper sections of the tube. The solution 4 occupies a certain height shown at the level 00. After the filling (or during the filling) the bubbling process is started. As soon as the gas bubbles which are extremely fine, are distributed in the bulk of the liquid by means of the porous filter candle 2, the foam begins to form and gradually extends to the upper regions of the tube. When the bubbling is sufficient, for example when the solution is exhausted, the foam is distributed in various sections of the tube. The various sections can then be dismounted and the foam of each section collected whereby there results a fractionation of the foam and of its constituents.

When one desires to liquify quickly certain fractions of the foam one can join on to the tube ($1^a, 1^b \ldots$), if necessary, after having removed the sections containing the required fractions produced by the dephlegmation, a defoaming tube 9 which is shown in Fig. 2 and is connected to any one of the sections of the first tube by means of a pipe 10 whose walls are of a well rounded shape. The defoaming tube 9 is surrounded by a jacket 11 into which one can, if necessary, introduce a current of warm water with the object of facilitating (by increase of temperature) the breaking down of the foam and its conversion into liquid. The liquid is collected in a container 12, disposed in such a way that the extremity of the defoaming tube 9 dips into the liquid 13. In this case, the atmosphere inside the apparatus remains saturated and the foam cannot dry by evaporation. The tube 9 may be connected to the top section or to any other section $1^a, 1^b, 1^c \ldots$, or defoaming tubes may be provided for each section.

The tube ($1^a, 1^b \ldots$) can, if necessary, also be provided with a heating or cooling device (immersion heating resistance, exterior jacket or heating coil).

The apparatus described above is suitable for solutions giving abundant foam if one takes care to choose for the tube a height which is sufficient to avoid the foam overflowing the tube or escaping into the defoaming tube 9, should the apparatus comprise such a tube. (Obviously at the end of the operation it may be advantageous to discharge the foam into the defoaming tube, for example by increasing the pressure of the gas.)

In the case when solutions to be treated contain only extremely small traces of foaming agents one could proceed in such a manner as to treat large quantities of liquid in containers of very large dimensions and the small quantity of foam could be collected in a tube of very small section.

The dephlegmator schematically shown in Fig. 3 is especially suitable for the treatment of very fluid solutions which give only a small quantity of foam (highly diluted solutions of protein, virus, serum or fatty acid salts, etc.). This foam dephlegmator comprises a lower bulb 14 which is filled with the liquid to be exhausted, up to about the level 00. Above this bulb 14 is mounted a tube which is divided into sections ($1^a, 1^b, 1^c$) the total height of which may be chosen as desired.

At the end of the dephlegmation of the foam i. e. when the liquid is completely exhausted, the gas supply is not interrupted (in order to maintain the desired equilibrium), but the various sections of the vertical tube are successively removed, commencing with the highest section, so as to collect separately the different fractions of the column of foam. These fractions can, if necessary, again be treated separately by further foam dephlegmation, either after dilution or directly in apparatus of more reduced volume.

Successive foam dephlegmations after re-dilution, if properly conducted, permit of remarkable separations in many cases, particularly for the separation of various proteins, hormones, vitamins, virus and of non-organised ferments (enzymes, diastases), etc.

It can happen for instance when it is necessary to subject to the foam forming treatment valuable substances which are present in only small amounts in the solutions or dispersions to be treated and giving very little foam, that the sectioning of the tube, provided for at the beginning, does not correspond sufficiently with the fractionation occurring in the foam column in the case where the latter arranges itself into a series the elements of which are sometimes of very varied volumes. It is in this case preferable to provide the foaming vessel 14 with a vertical tube 15 (Fig. 4) of sufficiently thin walls so that it can be divided into sections at the end of the operation with the aid of a glass cutter at suitable places in the foam column. In some cases, the tube 15 will have a very small internal diameter.

When the power of forming foam and the volume of liquid to be treated allow it, one can successfully use a foam dephlegmator apparatus as shown in Fig. 5 comprising a first tube 16 which is fed from a container 17 through a conduit 18 with cocks 19, 20 and pump 21. The top of the tube 16 leads into 22 in the base of a second tube 23, the said base being connected either with the outer atmosphere by a cock 24 or with the bottom of the first tube 16 by a conduit 25 having a cock 26 and pump 27.

The foaming gas enters the filter candle 2 through the conduit 3. A manometer is provided at 28.

The foam formed in the tube 16 rises into the tube 23 in which it becomes dephlegmated. The gas supply can be regulated in such a manner that the height of the foam does not exceed a certain level in the latter tube or on the other hand in such a manner that it reaches a defoaming tube 9a shown in Fig. 6 which is provided, for example, with a heating coil 11 and which may be connected by means of a pipe 10a to any one of the sections of the tube 23.

The liquid from the draining of the foam during the foam dephlegmation in the tube 23 and which, for example, can be separated by a grid 29 can, at will, be returned by the cock 26 and the pump 27 into the body of the liquid to be exhausted or on the other hand, the said liquid can be discharged from the apparatus by means of the cock 24. Furthermore, the base of the tube 23 can be connected by means of the cock 31 and pump 32 and conduit 30 with the supply container 17a and conduit 18a of a second foam forming apparatus which is shown on the left of Fig. 5 and which can be of identical or different dimensions. One also can connect in series several foam dephlegmators of this kind.

The various pumps shown facilitate pressure regulation in the liquid.

When choosing suitable volumes for the different portions of the apparatus and when consequently regulating the gas supplies in each of these, it is possible to make a foam dephlegmator in the form of multiple elements which can function continuously each like a dephlegmator for fractional distillation. Fig. 7 shows schematically such an apparatus comprising in cascade the tubes 16, 23, 33, 34, 35, the draining liquids being collected in the various containers 12 or led back to the lower tube 16 by the conduits and cocks as shown. A defoaming tube 9a may be used such as in the embodiment of Figures 5 and 6.

As already mentioned the invention is not restricted to the particular apparatus illustrated and described which are only given by way of example. Although the containers are shown as being of tubular shape it is obvious that their shape can be different and very much varied according to the substances to be treated. In all the foam dephlegmators described in this specification the bubble distributors can be either filter candles of porous porcelain, diaphragms of fritted glass of suitable porosity or a cluster of capillary tubes.

For the foam forming treatment, use may be made of other devices, such as jets, blowers or injectors, which have the advantage of being robust and of being easily cleaned.

According to the nature of substances to be treated and to be separated one can make use of gases other than air or nitrogen and utilise the properties of the gas to form chemical combinations with these substances.

The process, the apparatus described and their variations are susceptible to very numerous applications. Some of these are mentioned in the following.

They can be used for the separation of different proteins, or for the separation of different polymers of a polypeptide. It is possible by the dephlegmation of foam, to remove from a diluted solution of crude gelatine all the protein content which can be denatured by heat (albumins, globulines, etc.). Some of them flocculate irreversibly in the foams so obtained.

The application of the invention to the sols of colloidal silver containing or not proteins as protective colloids (collargol) will serve as an example to show the efficiency of the method according to the invention. When one foams a diluted sol of collargol so as to dephlegmate the foam, one finds, by simple visual observation or by measuring the opacity of the liquid during the dephlegmation of the foam that the liquid is rapidly deprived of colloidal silver. When all the silver has vanished from the residual liquid, the latter may still contain a certain quantity of proteins which have not yet been taken up into the foam but would be taken up if the foaming is continued further.

A remarkable fact is that during the whole duration of the operation and until the removal of the last traces of silver, no flocculation at all is produced in the liquid. On the other hand, the constituents of the foam, particularly the top fractions can flocculate irreversibly if the protective colloids used contain proteins which are denaturable by the foaming process.

The curve of Fig. 8 represents, as a function of time $t$ along the abscissa (in hours), the variation of the opacity (as the logarithm, log. 0) of a diluted sol of collargol during the foaming and foam dephlegmation with a constant gas supply, the opacity being substantially equal to K concentration of silver. The break $a$ in the curve arises from an acceleration of the speed of the removal of silver, corresponding to the addition to the liquid in the course of the foaming process of a very small quantity of alcohol (3 drops of absolute alcohol for about 400 cc. of liquid). This example illustrates in a very clear manner the influence, which has been mentioned before, of traces of dehydrating surface-active substances on the efficiency of foaming-draining of proteins. Metals in colloidal solutions without protective colloids (electrosols) can also be separated by the foaming-draining process.

The process according to the invention can be applied to the fractionation of numerous colouring matters and the fractionation of methyl violet will be given also by way of example.

It is known that the methyl violets are mixtures of tri-, tetra-, penta- and hexamethyl-pararosanilines. If an aqueous solution of this mixture without further additions is subjected to a foaming treatment, the foam is dephlegmated; the top fraction of the foam is almost entirely composed of the hexamethyl derivative (crystal violet) which is pure violet whereas the product at the lower section of the foam column is red-purple.

Towards the end of the operation the fractionation can if desired, be accelerated and considerably improved by adding to the liquid a very small quantity of gelatine so as to obtain a greater volume of foam.

The invention can be applied to the fractionation of two or of a greater number of substances, as it results from the following example:

When a diluted gelatine solution containing sodium oleate is subjected to a foam forming treatment, the top fractions of the foam column are exclusively composed of the gelatine. During foaming of a solution of gelatine and saponin, it is the saponin which is found in the top fractions. If the solution also contains sodium oleate, the dissolved substances are at least partly concentrated in the foam column in the following order; saponin, gelatine, oleate, i. e. not according to the surface-activities of the different compounds, but according to the rigidities of the interfacial layers which they form.

One can, moreover, by making use of certain factors such as temperature or the pH or by appropriately applying superfacial dehydration by traces of alcohol or acetone, complete the fractionation or even in certain cases modify the order thereof.

In the same way and for similar reasons, it is possible to separate from one another different proteins contained in one "solution" or different fractions of more or less polymerized forms of one protein.

Thus my foaming-dephlegmation process has very interesting applications in biological chemistry, especially for the isolation of different substances contained in physiological liquids, for example the proteidic and lipoidic substances of blood serum or of various plasma as well as for the separation of enzymes, of virus (non-filtrable virus), of hormones or of vitamins.

By suitable foam dephlegmation of urine one can extract therefrom among other substances the albuminoids, bile pigments and certain hormones (oestrone, androsterone, testosterone).

Having now described my invention what I claim as new and desire to secure by Letters Patent is:

1. A method of separating a plurality of substances capable of forming foams of different rigidities which comprises subjecting a dissipation of the substances in a large proportion of water to a dispersed current of inert gas so as to form a column of foam directly above the liquid, continuing the foam-forming treatment until the amount of foam produced becomes constant, and the substances therein become segregated at different heights in the foam column, due to the difference in rigidities of the foams, and removing at least one of the substances which has thus been segregated from the remainder of the foam.

2. A method of separating a plurality of substances capable of forming foams of different rigidities which comprises subjecting a dispersion of the substances in a large proportion of water containing a small amount of a lower aliphatic monohydroxy alcohol to a dispersed current of inert gas so as to form a column of foam directly above the liquid, continuing the foam-forming treatment until the amount of foam produced becomes constant, and the substances therein become segregated at different heights in the foam column, due to the difference in rigidities of the foams, and removing at least one of the substances which has thus been segregated from the remainder of the foam.

MARCEL MARIE BERTRAND ABRIBAT.